United States Patent [19]

Paulsson

[11] 4,010,555

[45] Mar. 8, 1977

[54] APPARATUS FOR DEMONSTRATING ELECTRICAL CIRCUITS AND COMPONENTS

[76] Inventor: Bo Gunnar Paulsson, Nynasgatan 7, 252 52 Helsingborg, Sweden

[22] Filed: May 23, 1973

[21] Appl. No.: 363,000

[30] Foreign Application Priority Data

May 31, 1972 Sweden .............................. 7127/72
Sept. 13, 1972 Sweden ........................... 73069/72

[52] U.S. Cl. .............................................. 35/19 A
[51] Int. Cl.² ........................................ G09B 23/18
[58] Field of Search ......... 35/7 A, 19 A; 40/142 A; 200/166 C; 317/101 CC, 101 CM

[56] References Cited

UNITED STATES PATENTS

| | | | |
|---|---|---|---|
| 3,302,270 | 2/1967 | Grabbe | 200/166 C X |
| 3,423,846 | 1/1969 | Arend | 35/19 A |
| 3,447,249 | 6/1969 | Greger | 35/19 A |
| 3,510,963 | 5/1970 | Zbar et al. | 35/19 A |
| 3,641,300 | 2/1972 | Nitz | 200/166 C |

*Primary Examiner*—Richard C. Pinkham
*Assistant Examiner*—Vance Y. Hum
*Attorney, Agent, or Firm*—Beveridge, DeGrandi, Kline & Lunsford

[57] ABSTRACT

A system for demonstration of electrical circuits and components on a base of magnetic material including support housings for accommodating electrical circuit components and magnetic elements for mounting said support housings on said base and electrical conductors for connecting said components with each other providing electrical circuits.

11 Claims, 17 Drawing Figures

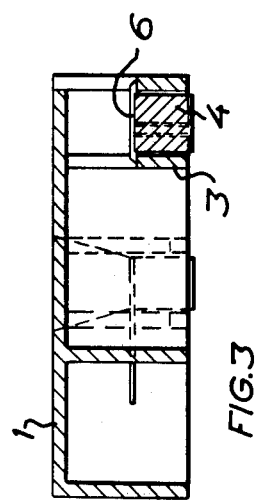
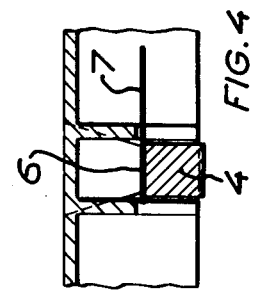
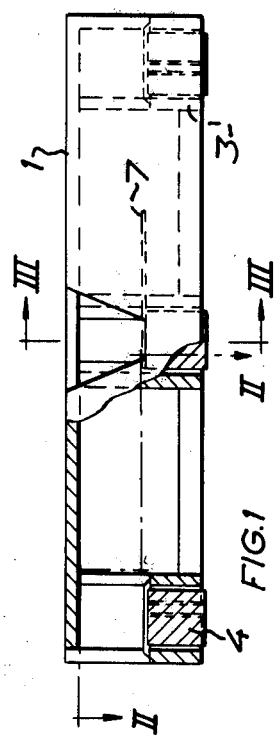
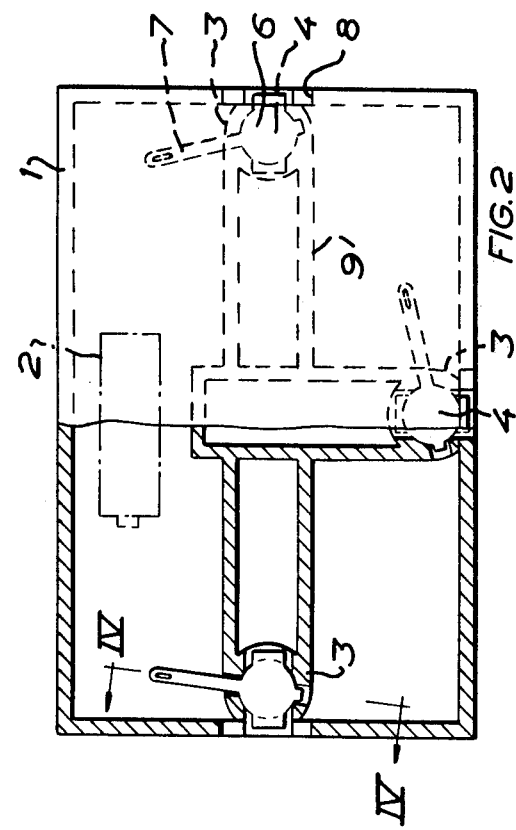

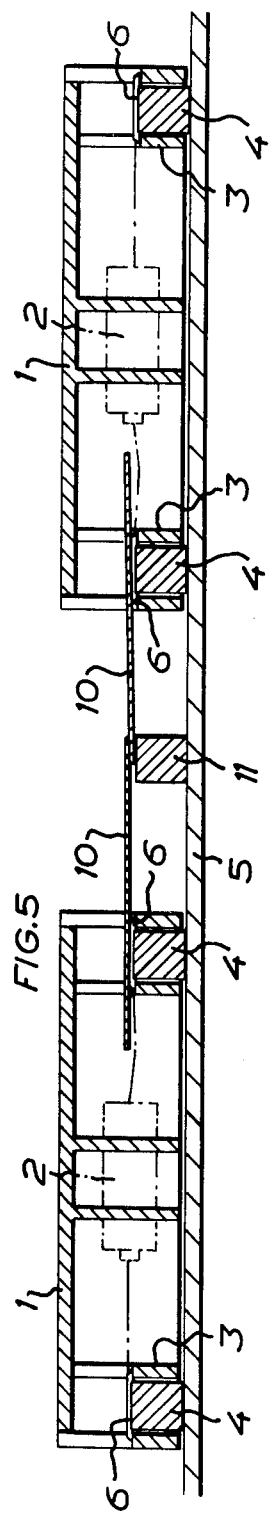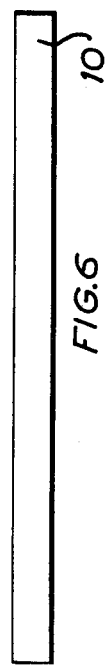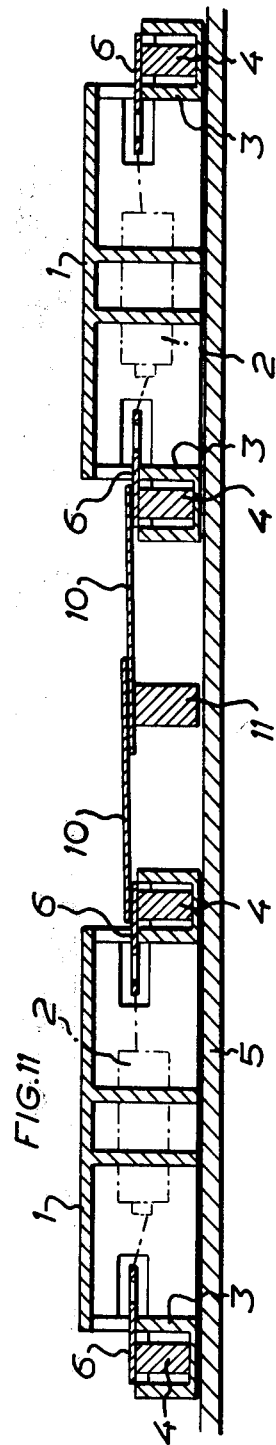

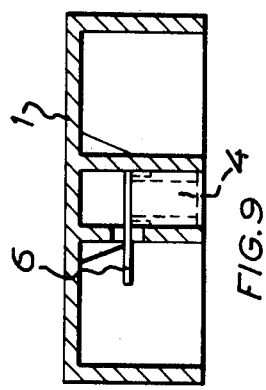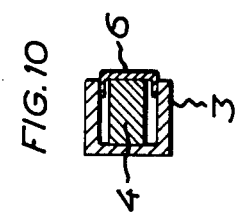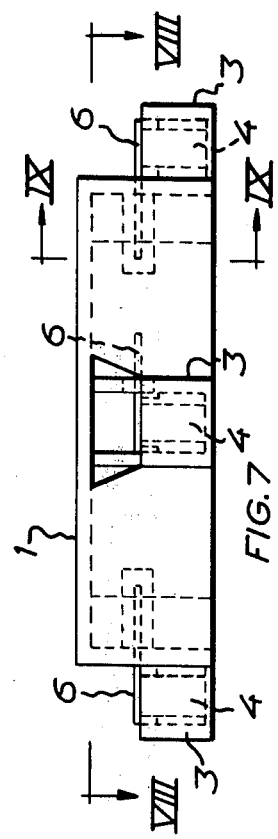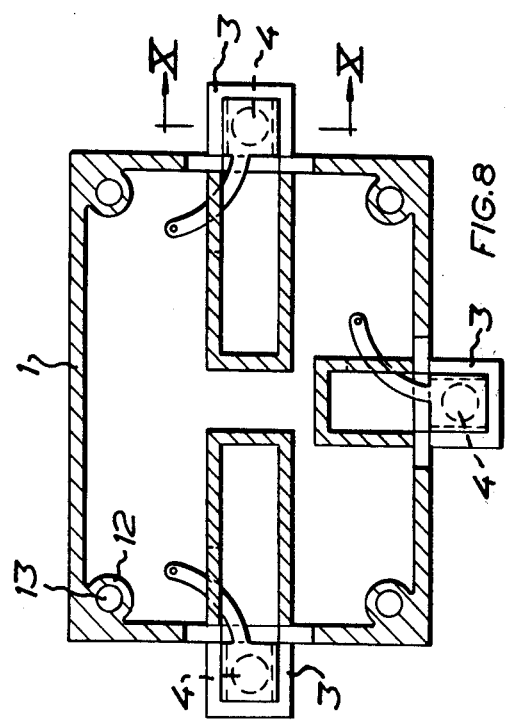

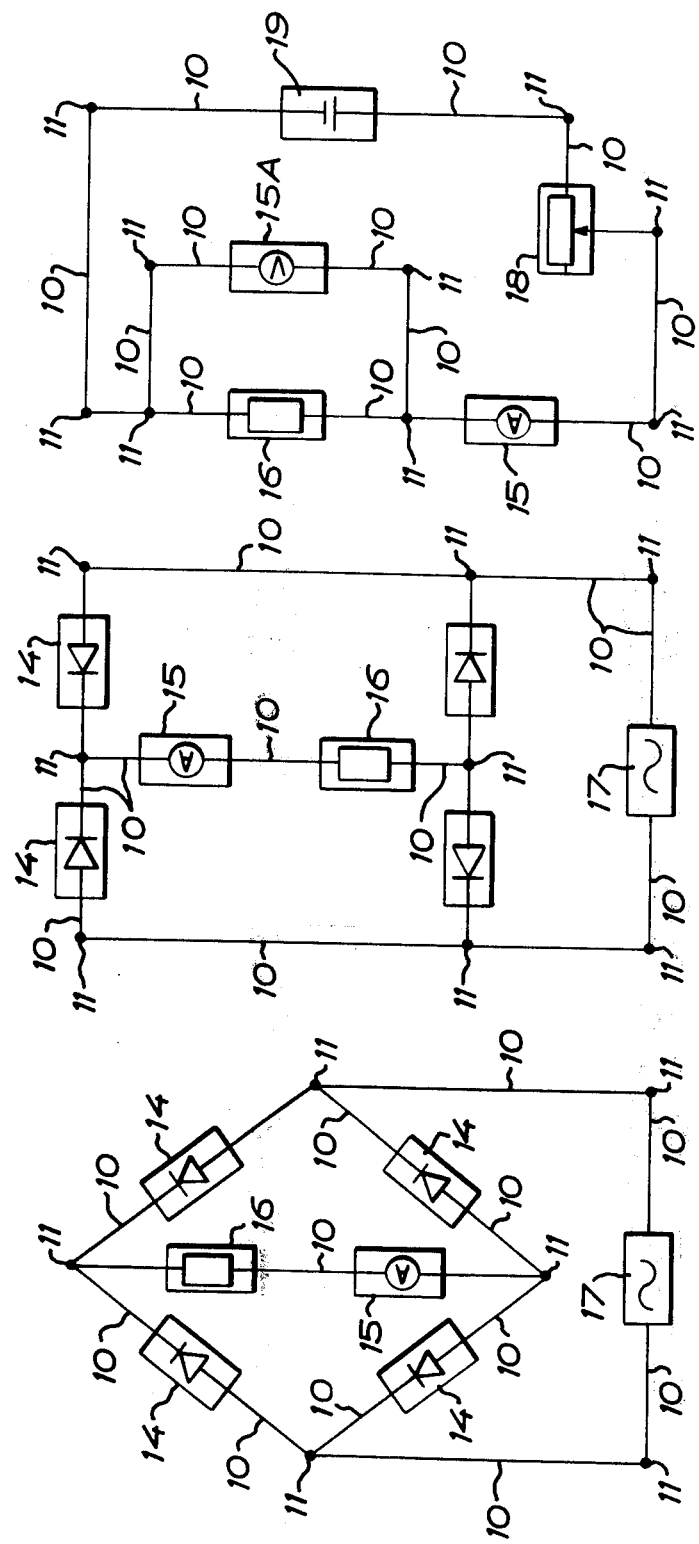

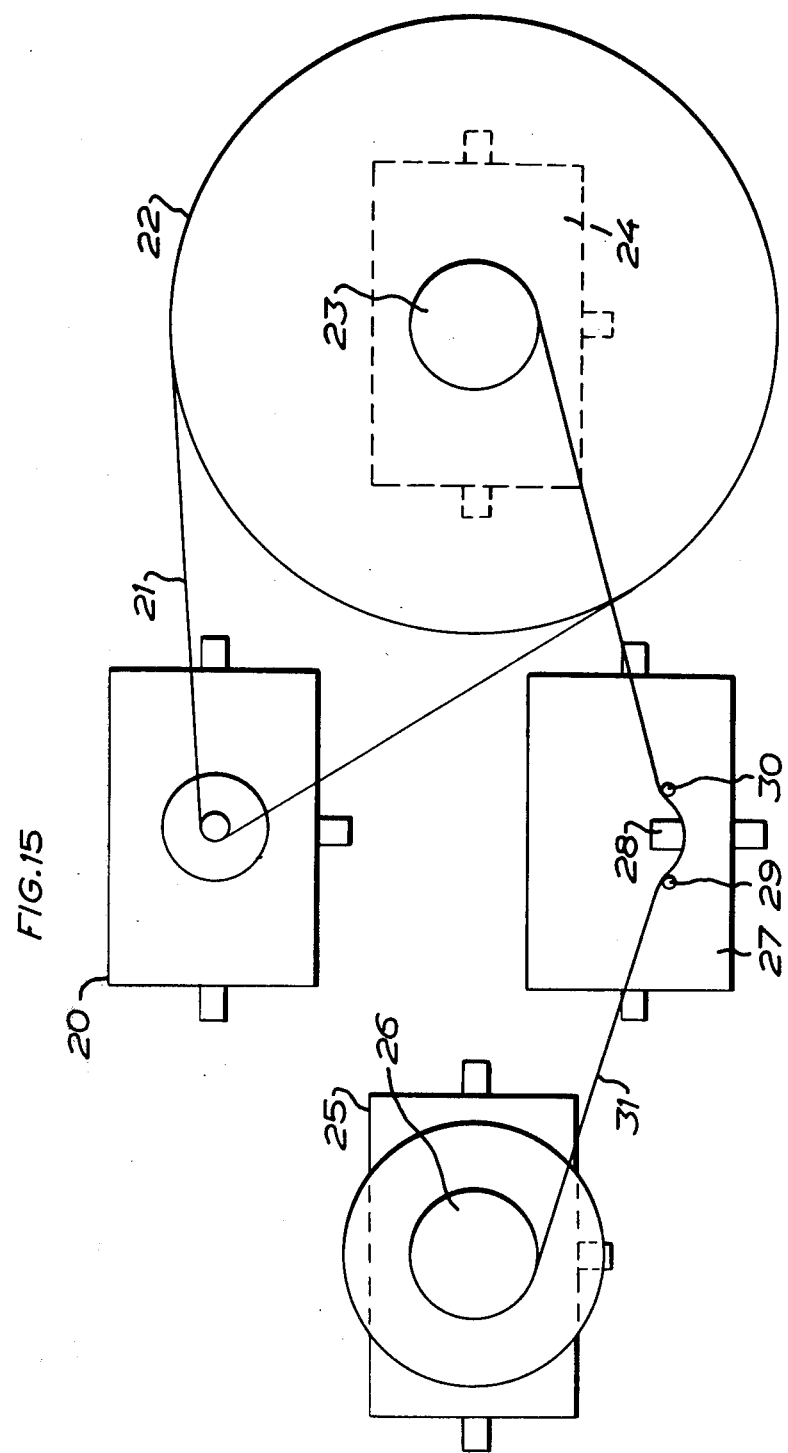

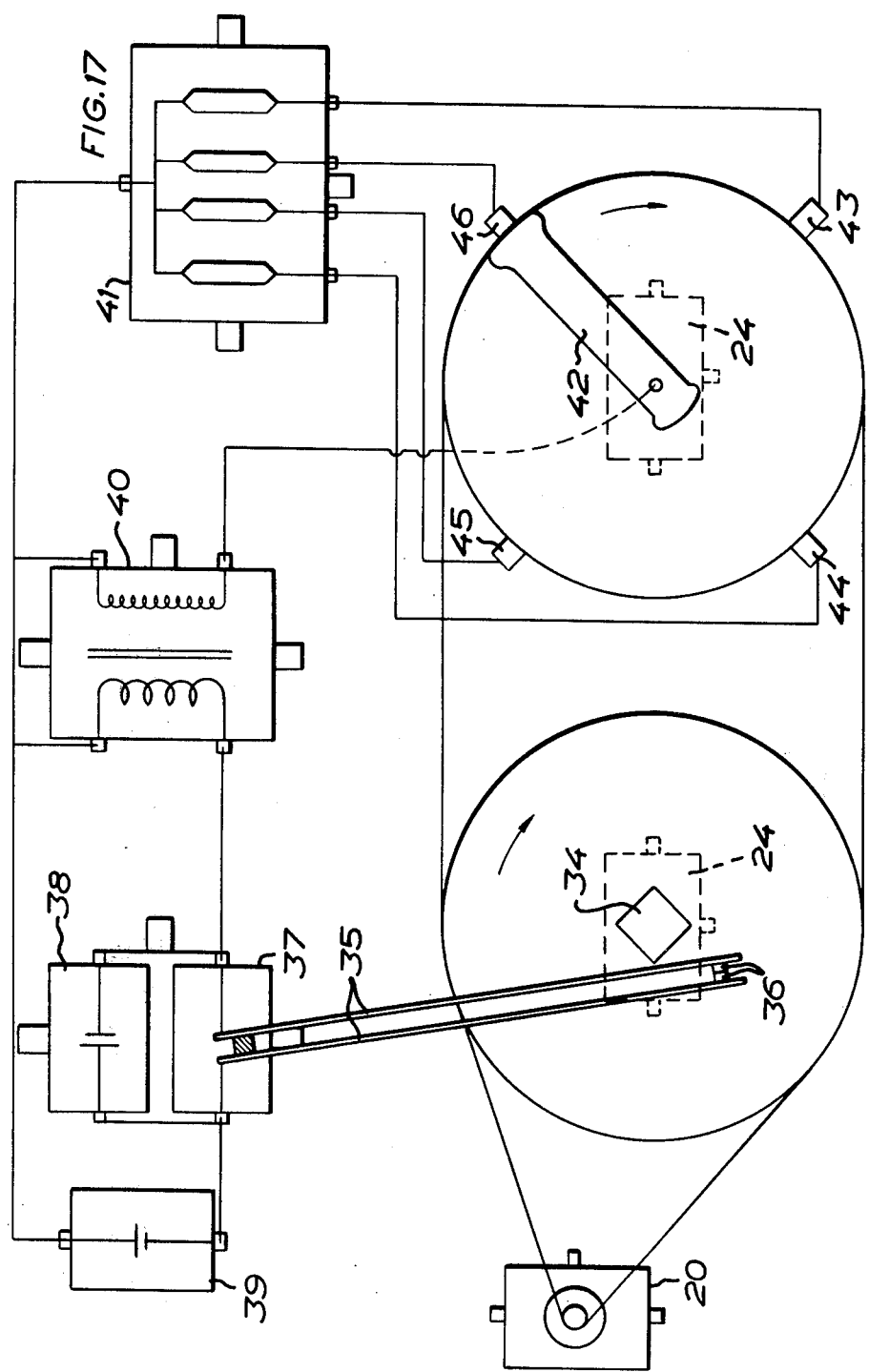

APPARATUS FOR DEMONSTRATING ELECTRICAL CIRCUITS AND COMPONENTS

This invention relates to an apparatus for demonstrating electrical circuits and components, comprising a board of magnetic material and support housings accommodating electrical components and intended for mounting on said board.

Apparatuses of this type are disclosed by Swedish printed patent application No. 304,124, Swiss patent specification No. 504,748, West-German Auslegeschrift No. 1 145 922 and West-German Offenlegungschriften Nos. 154 501 and 1 772 310. These publications are mentioned here for a definition of the prior art in this field.

Swedish printed patent application No. 304 124 and Swiss patent specification No. 504 748 describe two rather closely related systems having support housings for one or more electrical components. The support housings are approximately cube-shaped, and at the underside and on one or more of their side walls have a connector member as well as a magnet on the inside of each connector member, the connections of an electrical component accommodated in said support housing being soldered to the connector members in such a way that the connector member at the underside of the support housing leads to a connector element common to the components of all support housings, said connector element mostly being a neutral conductor. To form an electrical circuit with such support housings firstly places very great demands on the board on which the support housings shall be placed since the board shall be the neutral conductor and there must be a perfect contact between the connector members at the underside of the support housings and the board, and secondly great demands are placed on the smoothness of the board and on the manufacturing tolerances of the support housings since the support housings constituting the electrical circuit to be established have to be placed so close together that the connector members on the side walls of the support housings will come into satisfactory electrical contact with each other. The magnets at the rear of the connector members will naturally facilitate establishment of the desired contact between the connector members but the greater the clearances between the support housings and thus the connector members the larger magnets are necessary. It is of course desirable to have as small magnets as possible with respect to the dimensions of the support housings.

The systems described in the other publications referred to above include boards and fixation and connecting means of a very particular design which highly restricts the use of these prior art systems and involve high costs of manufacture.

The principal disadvantages of the prior art systems reside in the complicated construction of the support housings themselves, high requirements of tolerance which imply high costs of manufacture and unreliable function as the latter has to be related to the manufacturing tolerances and the desired electrical contact, that is difficult to realize, between the connector members on the one hand and the connector members and the board on the other hand.

The present invention has for its object wholly or partly to eliminate the disadvantages of the prior art systems and to provide an apparatus of the type indicated in the foregoing, which permits an extraordinarily free, clear and easily comprehensible demonstration of electrical circuits and components. This demonstration int.al. includes the assembly of so complicated circuits as gramophone amplifiers, tape recorders etc., in which high demands are placed on int.al. a reliable electrical contact at the various junctions. Moreover, the apparatus shall be of as simple a design as possible to keep the costs of manufacture low.

These and further objects are attained according to the invention by providing the support housings with one or more first magnets for retaining the support housings to the board and conductors of magnetic material extending between the support housings and between the support housings and junctions.

The invention will be more closely defined hereinbelow with reference to the accompanying drawings in which:

FIG. 1 is a diagrammatic side view of a support housing according to the invention, part of which is shown in section;

FIG. 2 is a horizontal sectional view of the support housing shown in FIG. 1, taken on section line II—II in FIG. 1;

FIG. 3 is a sectional view of the support housing, taken on section line III—III in FIG. 1;

FIG. 4 is a sectional view taken on section line IV—IV in FIG. 2;

FIG. 5 is a vertical longitudinal section of two support housings and conductors connecting the housings;

FIG. 6 depicts a connector element according to the invention;

FIG. 7 is a side view of a second embodiment of the invention;

FIG. 8 is a sectional view taken on section line VIII—VIII in FIG. 7;

FIG. 9 is a sectional view taken on section line IX—IX in FIG. 7;

FIG. 10 is a sectional view taken on section line X—X in FIG. 8;

FIG. 11 is a section similar to that shown in FIG. 5, the support housings being of the embodiment illustrated in FIGS. 7–10;

FIGS. 12–14 depict diagrams of electrical circuits which can be formed using support housings and conductors according to the present invention;

FIGS. 15–17 depict further electrical circuits which can be formed using support housings according to the invention.

Figure 16:
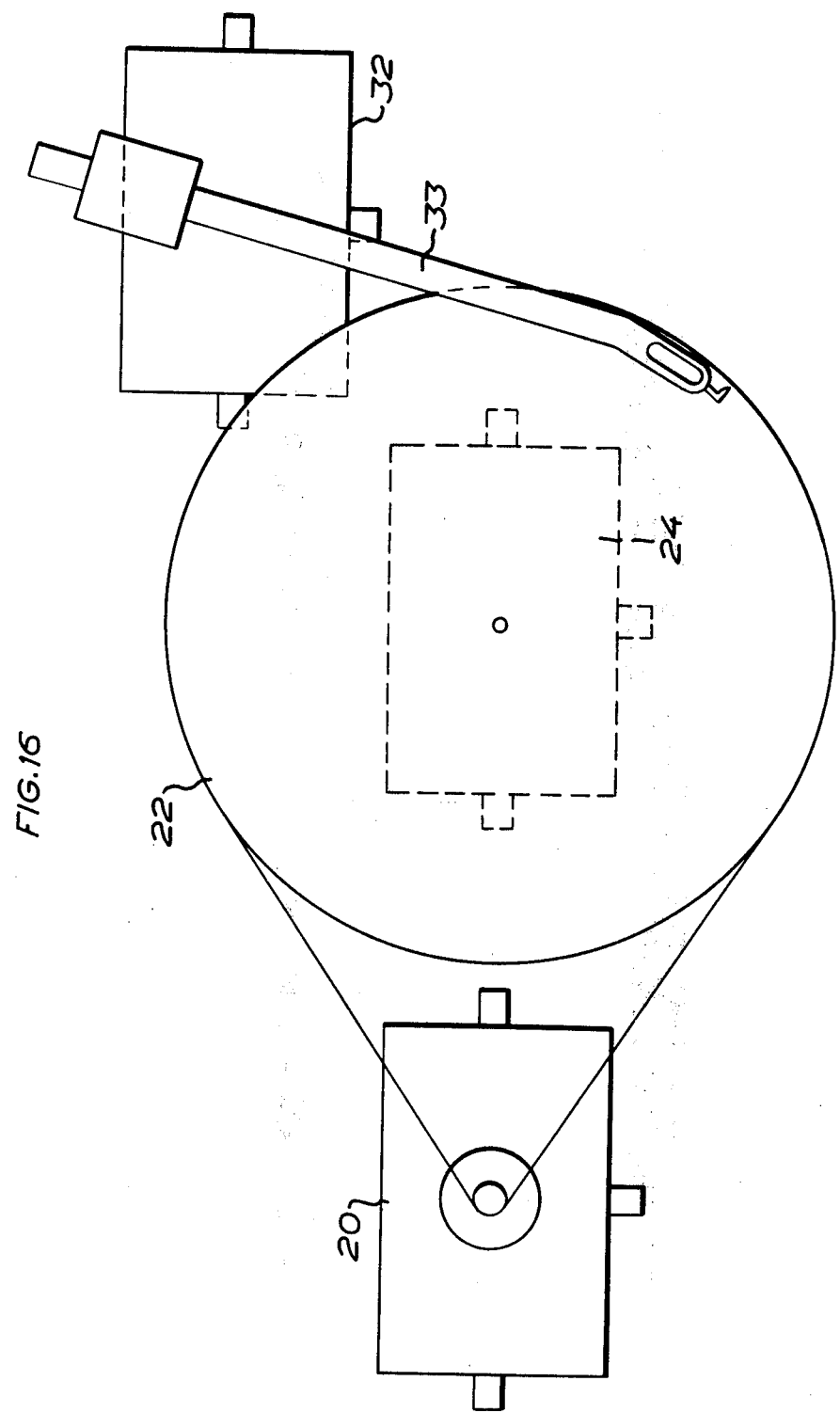

The embodiment of the invention illustrated in FIGS. 1–5 comprises a support housing 1 preferably moulded in a suitable insulating material, for instance a plastic. The support housing 1 has rectangular shape and its upper side shall be marked with a symbol (not shown) representing an electrical component 2 accommodated in the support housing 1. This component may be any electrical component whatever, such as a resistor, as in the support housing illustrated in FIG. 2, a capacitor, a transistor, a diode, a thyristor, etc. The component can also be a motor, one or more plug sockets for the connection of an instrument or a source of current, a transducer head (sound head), a transformer, etc. Moreover, the electrical component may be a battery, a current distributor rotor, a breaker cam shaft. For the assembly of certain particular electrical circuits there may be provided support housings 1 accommodating a pulley with a magnetic tape reel, a turntable, an arm for a pick-up etc.

As already mentioned, the support housing 1 illustrated in the drawings is of rectangular shape and has a certain height, the underside being open so that the electrical component 2 accommodated in the support housing 1 may be repaired or replaced in an extremely simple manner.

Each support housing 1 accommodates at least one cylindrical holder 3. In the embodiment illustrated in FIGS. 1–4 the support housing 1 has three cylindrical holders 3. Disposed in each cylindrical holder 3 is a magnet 4 which may be a permanent magnet and which preferably is a ceramic permanent magnet devoid of electrical conductivity. The magnets 4 serve to hold the support housing 1 to a base in the form of a board 5 (FIG. 5) of magnetic material, for instance a ferromagnetic material. The board 5 may be mounted for instance on a wall or the like, which permits displaying the support housings 1 in a extremely lucid manner to an auditorium.

Arranged on each magnet 4 is a connector 6 in the form of a connector member having a contact finger or soldering lug 7. As will appear particularly from FIG. 2, the soldering lugs 7 serve for the fixation of the terminals of the electrical component 2. Thus the terminals of the electrical component 2 will be accessible via connector members 6 and through an opening 8 formed in the side wall of the support housing in the vicinity of each of said connector members. The connector member 6 can be got at through the opening 8. As shown in FIG. 2 only two of the connector members 6 are used in this case to connect the electrical component 2 in an electric circuit. The third connector member 6 with its permanent magnet 4 is only utilized to facilitate the retention of the support housing to the board 5. It is obvious that the connector member 6 may be dispensed with in this case and that any number whatever of auxiliary magnets 4 may be utilized.

Reinforcing walls 9 are provided within the support housing to extend between the cylindrical holders 3. Said reinforcing walls are preferably made integral with the outer walls of the support housing 1.

As shown in FIG. 5 two support housings 1 are electrically connected each to one electrical component 2, in the present instance a resistor, whereby the wiring illustrated in FIG. 5 results in a series connection of the two resistors. After the support housings 1 have been mounted on the board 5 to which they are retained by the magnets 4, the resistors are interconnected by the intermediary of one or more electrical conductors 10 (FIG. 6).

The conductor 10 in FIG. 6 is a rail of a magnetic metal, for instance a ferromagnetic metal, which is coated with a thin copper layer and on top of that with a thin silver layer whereby a perfect electrical contact is ensured between two or more conductors 10 or between one conductor 10 and one connector member 6. To provide a good contrast to the board 5 the conductors 10 are treated with liver of sulfur.

According to FIG. 5, an electrical conductor 10 extends from the connector member 6 in one support housing 1 to a magnet 11 which is placed between the support housings and which like the magnet 4 is a permanent magnet preferably of the ceramic type. A conductor 10 extends from the magnet 11 to the connector member 6 of the second support housing. Of course, the conductors 10 are made of an electrically conductive magnetic material whereby they are retained by the magnets 4, 11 and a perfect electrical contact is ensured. Moreover, the electrically conductive connector members 6 and the conductors 10 are kept electrically insulated from the board 5 because the magnets 4, 11 are ceramic magnets. The conductors may be of any suitable length whatever and openings may be formed in the reinforcing walls 9 for running conductors therethrough so that the length thereof will not be critical.

Fundamentally, any electrical circuit whatever can be formed with the apparatus according to the invention, depending upon the type of component in the support housing 1.

FIGS. 7–11 illustrate a modification of the foregoing embodiment of the present invention. This modification mainly differs from the preceding embodiment in that the holders 3 for the magnets 4 are situated on the outer side of the support housing 1 proper, and furthermore the undersides of the holders are unbroken so that the magnets 4 will be fully enclosed in the holders 3 by the connector member 6. Also, this embodiment may have further holders 12 for auxiliary magnets 13 which may be of the same type as the magnets 4.

As will be best seen from FIG. 11 this embodiment facilitates placing the conductors 10 between the support housings 1 and above all it readily permits two support housings to be connected in parallel.

FIGS. 12–14 show examples of some electrical circuits which may be formed in an extremely simple manner by the intermediary of the apparatus according to the invention. FIGS. 12 and 13 show two different types of rectifier bridges. The rectifier bridge in FIG. 12 comprises four diode support housings 14, an ammeter support housing 15 and a resistor support housing 16 being connected in series between two confronting junctions of the bridge, while a support housing 17 for supplying a.c. voltage is connected between the two other confronting junctions of the bridge. This circuit is wholly conventional and for this reason it would not seem necessary to enter upon its function, but it should be observed that a magnet 11 is placed at each junction and conductors 10 of the type shown in FIG. 6 extend between the magnets 11 and the support housings.

The rectifier bridge illustrated in FIG. 13 fundamentally is of precisely the same type as that illustrated in FIG. 12 and comprises the same components as the bridge in FIG. 12. However, the apparatus according to the present invention has been utilized in a slightly other manner in the structure according to FIG. 13 than in that according to FIG. 12, which will evidence the great freedom the apparatus according to the invention provides in demonstrating the structure of an electrical circuit.

FIG. 14 shows an example of a further electrical circuit which has been formed by the intermediary of the apparatus according to the invention. This circuit is intended to demonstrate the volt ammeter method for establishing the value of a resistor, and the circuit incorporates some of the components illustrated in FIGS. 12 and 13 but also a support housing 18 accommodating a variable resistor, a support housing 19 accommodating a d.c. source, for instance in the form of a battery, and a voltmeter support housing 15A. The circuit shown in FIG. 14 permits establishing the value of the resistor in the support housing 16.

FIGS. 15, 16 and 17 show examples of further circuits which can be demonstrated by the apparatus according to the invention.

The circuit in FIG. 15 is a magnetic tape recorder having a support housing 20 accommodating an electric motor driving a belt 21 which in turn drives a pulley 22 which carries a magnetic tape reel 23 and is mounted in a support housing 24. Moreover, the circuit includes a support housing 25 accommodating a further magnetic tape reel 26, and a support housing 27 having a sound head 28 and two guides 29 and 30 biasing the magnetic tape 31 extending between the magnetic tape reels 23 and 26.

FIG. 16 depicts the structure of a record-player, in which the support housing 24 illustrated in FIG. 15 and accommodating the pulley 22 is utilized as a turntable and the support housing 20 accommodating an electric motor is utilized to drive the turntable 22. This circuit also comprises a support housing 32 accommodating an arm 33 for a pick-up.

FIG. 17 depicts an electrical ignition system for an internal combustion automobile engine, use being made of the motor support housing 20 and two pulley support housings 24. The pulley support housing 24 shown to the left in FIG. 17 has a breaker camshaft 34 for cooperation with breaker arms 35 carrying breaker contacts 36. The breaker arms 35 are mounted in a support housing 37 which is connected in parallel with a capacitor support housing 38. Furthermore, a capacitor support housing 39 is connected to the breaker arm support housing 37 and to a transformer support housing 40 and a support housing 41 accommodating low-voltage glow lamps representing spark plugs. The support housing 24 situated to the far left furthermore carries a current distributor rotor arm 42 which is moved into engagement with contacts 43, 44, 45 and 46 which may be disposed on magnets placed on the board 5 and identical with the earlier described magnets 4 and 11.

The circuits described in connection with FIGS. 12–17 should of course be considered only as examples of the possibilities of utilizing the invention, and the invention must not of course be considered limited to the embodiments illustrated.

What I claim and desire to secure by Letters Patent is:

1. In an apparatus for demonstrating electrical circuit means and electrical circuit component means, base means including magnetic material, support means for accommodating said circuit means and for mounting on said base means, contact means for electrical connection with said circuit means in each of said support means, each of said contact means being mounted on said support means above said magnetic material and extending in a plane parallel to and spaced a distance from the plane common to said support means and said base means, conductor means for extension between said contact means of said support means and for electrical coupling of them with each other and said conductor means including magnetic material and extending in the same plane as said contact means, said support means being provided with magnetic means for retaining said support means and said conductor means to said base means and holding said conductor means and said contact means together.

2. An apparatus as claimed in claim 1, wherein said support means are provided with additional magnet means for retaining said support means to said base means.

3. An apparatus as claimed in claim 2, wherein said magnet means are ceramic permanent magnets.

4. An apparatus as claimed in claim 1 comprising separate magnet means on said base means to retain said conductors extending between said support means, said conductors extending between said support means and crossings between said conductors, and conductors extending between said crossings.

5. An apparatus as claimed in claim 4, wherein said magnet means are ceramic permanent magnets.

6. An apparatus as claimed in claim 5, wherein said magnets are cylindrical ceramic permanent magnets.

7. An apparatus as claimed in claim 4, wherein said conductors extending between said support means, between said support means and said crossings, and between said crossings are in the form of rails of magnetic material.

8. An apparatus as claimed in claim 4, wherein said holding means are situated on the outer side of the main contour of said support means.

9. An apparatus as claimed in claim 1, comprising holding means for said magnet means, said holding means being provided on said support means.

10. An apparatus as claimed in claim 1, wherein said contact means have contact finger means for interconnection with the terminals of said electrical circuit means in said support means.

11. An apparatus as claimed in claim 1, wherein said magnet means are ceramic permanent magnets.

* * * * *